(12) United States Patent
Lee et al.

(10) Patent No.: US 9,894,467 B2
(45) Date of Patent: Feb. 13, 2018

(54) METHOD AND APPARATUS FOR STARTING OR STOPPING DEVICE-TO-DEVICE OPERATION IN WIRELESS COMMUNICATION SYSTEM

(71) Applicant: LG ELECTRONICS INC., Seoul (KR)

(72) Inventors: Youngdae Lee, Seoul (KR); Sunghoon Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/906,805

(22) PCT Filed: Aug. 4, 2014

(86) PCT No.: PCT/KR2014/007185
§ 371 (c)(1),
(2) Date: Jan. 21, 2016

(87) PCT Pub. No.: WO2015/020383
PCT Pub. Date: Feb. 12, 2015

(65) Prior Publication Data
US 2016/0174284 A1  Jun. 16, 2016

Related U.S. Application Data

(60) Provisional application No. 61/862,074, filed on Aug. 4, 2013.

(51) Int. Cl.
*H04W 4/00* (2009.01)
*H04W 4/08* (2009.01)
(Continued)

(52) U.S. Cl.
CPC .......... *H04W 4/008* (2013.01); *H04B 17/309* (2015.01); *H04L 67/1051* (2013.01);
(Continued)

(58) Field of Classification Search
CPC .......................... H04W 76/023; H04W 72/04
(Continued)

(56) References Cited

U.S. PATENT DOCUMENTS 9,066,221 B2  6/2015 Lee
2005/0207384 A1  9/2005 Quick, Jr.
(Continued)

FOREIGN PATENT DOCUMENTS

WO  WO 2011/130630 A1  10/2011
WO  WO 2012/048464 A1  4/2012
(Continued)

OTHER PUBLICATIONS

3GPP, "3rd Generation Partnership Project; Technical Specification Group Services and System Aspects; Study on architecture enhancements to support Proximity Services (ProSe) (Release 12)," 3GPP TR 23.703 V0.5.0, Jul. 2013 (Downloaded by EPO on Jul. 27, 2013), pp. 1-175.
(Continued)

*Primary Examiner* — Iqbal Zaidi
(74) *Attorney, Agent, or Firm* — Birch, Stewart, Kolash & Birch, LLP

(57) ABSTRACT

A method and apparatus for starting or stopping a device-to-device (D2D) operation in a wireless communication system is provided. A user equipment (UE) supporting proximity services (ProSe) receives system information which indicates starting or stopping a D2D operation from a network, and starts or stops the D2D operation according to the system information. The system information may include a D2D start/end time which indicates when the D2D operation is started or stopped.

8 Claims, 9 Drawing Sheets

(51) Int. Cl.

| | | |
|---|---|---|
| *H04W 8/18* | (2009.01) | |
| *H04W 36/06* | (2009.01) | |
| *H04W 36/30* | (2009.01) | |
| *H04B 17/309* | (2015.01) | |
| *H04W 56/00* | (2009.01) | |
| *H04W 72/04* | (2009.01) | |
| *H04W 76/04* | (2009.01) | |
| *H04W 4/06* | (2009.01) | |
| *H04W 8/00* | (2009.01) | |
| *H04W 48/16* | (2009.01) | |
| *H04W 76/02* | (2009.01) | |
| *H04W 76/06* | (2009.01) | |
| *H04L 29/08* | (2006.01) | |
| *H04W 84/20* | (2009.01) | |
| *H04W 84/18* | (2009.01) | |
| *H04W 88/06* | (2009.01) | |

(52) U.S. Cl.
CPC ............ *H04W 4/005* (2013.01); *H04W 4/06* (2013.01); *H04W 4/08* (2013.01); *H04W 8/005* (2013.01); *H04W 8/186* (2013.01); *H04W 36/06* (2013.01); *H04W 36/30* (2013.01); *H04W 48/16* (2013.01); *H04W 56/0015* (2013.01); *H04W 72/0446* (2013.01); *H04W 76/023* (2013.01); *H04W 76/043* (2013.01); *H04W 76/06* (2013.01); *H04W 84/18* (2013.01); *H04W 84/20* (2013.01); *H04W 88/06* (2013.01)

(58) Field of Classification Search
USPC .................................................. 370/328–339
See application file for complete search history.

(56) References Cited

U.S. PATENT DOCUMENTS

| | | |
|---|---|---|
| 2010/0009675 A1 | 1/2010 | Wijting et al. |
| 2011/0117907 A1 | 5/2011 | Hooli et al. |
| 2011/0258313 A1 | 10/2011 | Mallik et al. |
| 2012/0294184 A1 | 11/2012 | Jung et al. |
| 2012/0322484 A1 | 12/2012 | Yu et al. |
| 2013/0089010 A1 | 4/2013 | Richardson et al. |
| 2013/0109301 A1 | 5/2013 | Hakola et al. |
| 2013/0148526 A1 | 6/2013 | Hwang et al. |
| 2013/0170398 A1 | 7/2013 | Kwon |
| 2013/0288645 A1 | 10/2013 | Zheng |
| 2013/0290696 A1* | 10/2013 | Broustis ............... H04L 9/08 713/150 |
| 2013/0322413 A1* | 12/2013 | Pelletier ............ H04W 72/1289 370/336 |
| 2014/0141777 A1 | 5/2014 | Guo |
| 2014/0192739 A1 | 7/2014 | Liao |
| 2014/0269668 A1* | 9/2014 | Zhu ..................... H04J 3/07 370/350 |
| 2014/0348061 A1 | 11/2014 | Salkintzis |
| 2016/0065362 A1 | 3/2016 | Choyi et al. |

FOREIGN PATENT DOCUMENTS

| | | |
|---|---|---|
| WO | WO 2013/052126 A1 | 4/2013 |
| WO | WO 2013/067686 A1 | 5/2013 |

OTHER PUBLICATIONS

Samsung, "Design aspects for D2D group communication", R1-131997, 3GPP TSG RAN WG1 Meeting #73, Fukuoka, Japan, May 20-24, 2013, pp. 1-2. http://www.3gpp.org/ftp/tsg_ran/WG1_RL1/TSGR1_73/Docs/R1-131997.zip.
U.S. Appl. No. 14/909,867, filed Feb. 3, 2016.
U.S. Appl. No. 14/909,808, filed Feb. 3, 2016.
U.S. Appl. No. 14/906,758, filed Jan. 21 2016.
Ericsson et al., "D2D for LTE Proximity Services: Overview," 3GPP TSG-RAN WG1 #73, R1-132028, Fukuoka, Japan, May 20-24, 2013, pp. 1-6.

* cited by examiner

[Fig. 1]
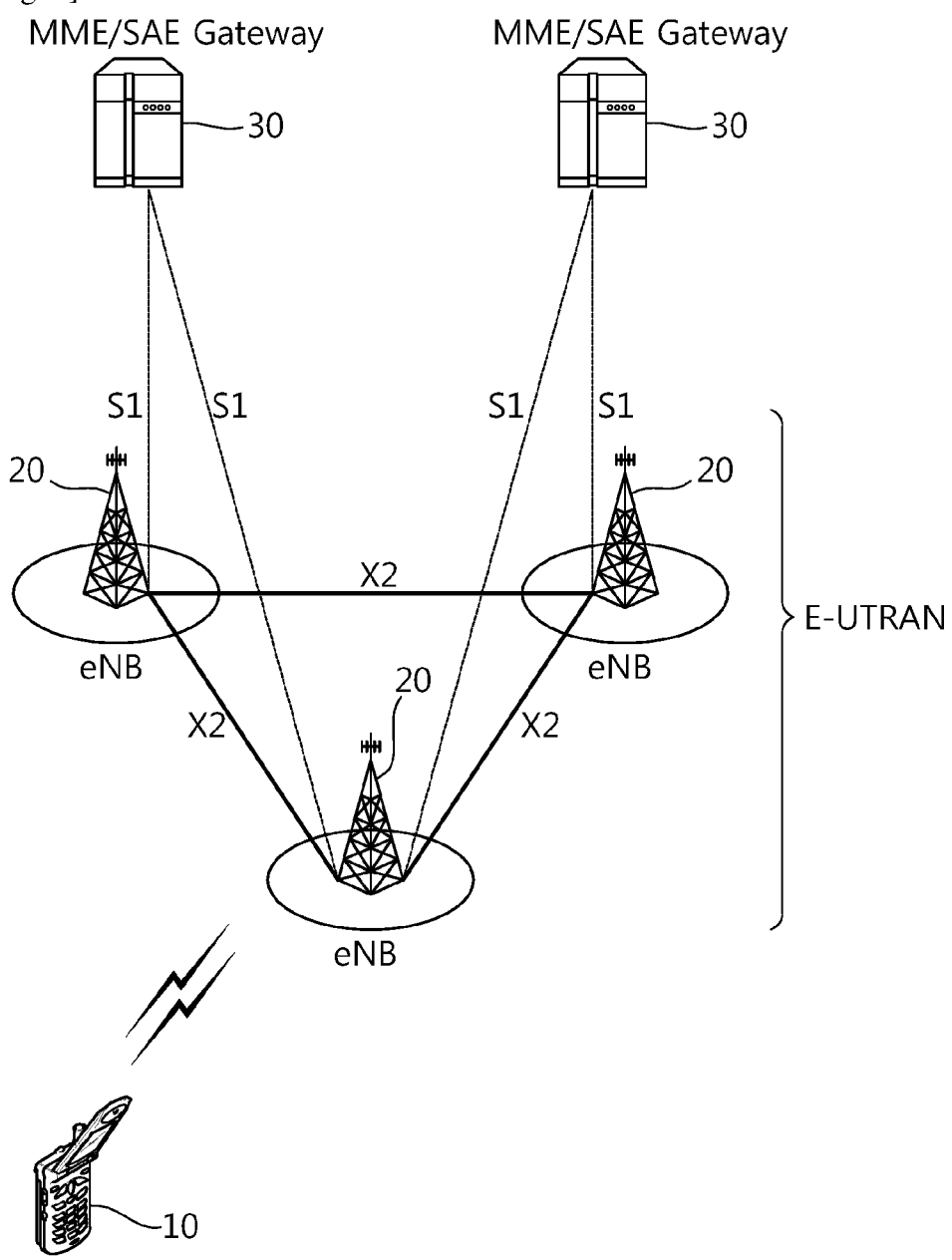

[Fig. 2]
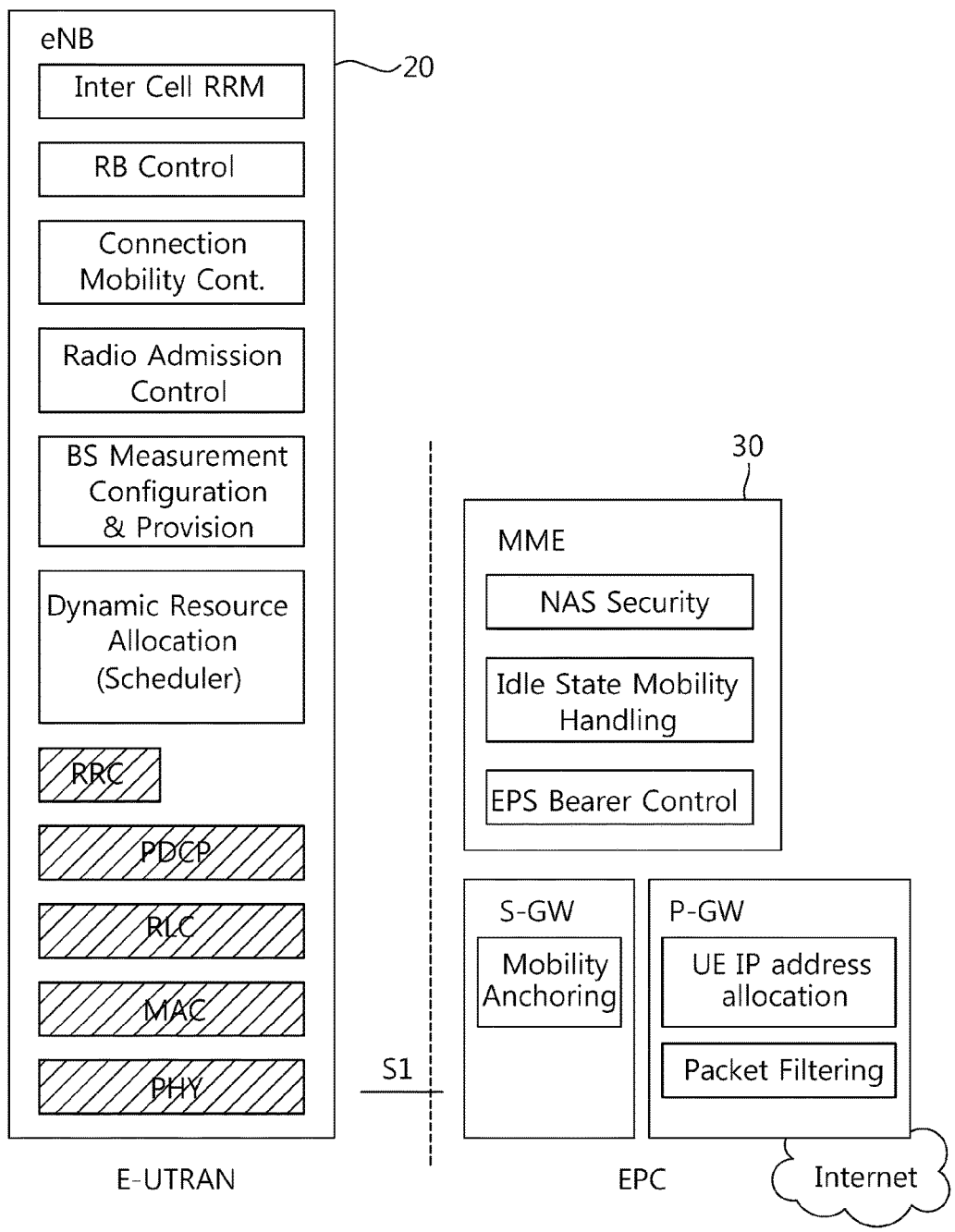

[Fig. 3]
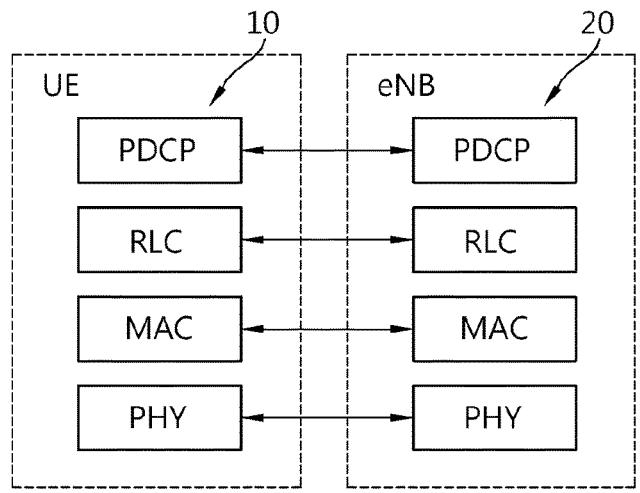
(a)
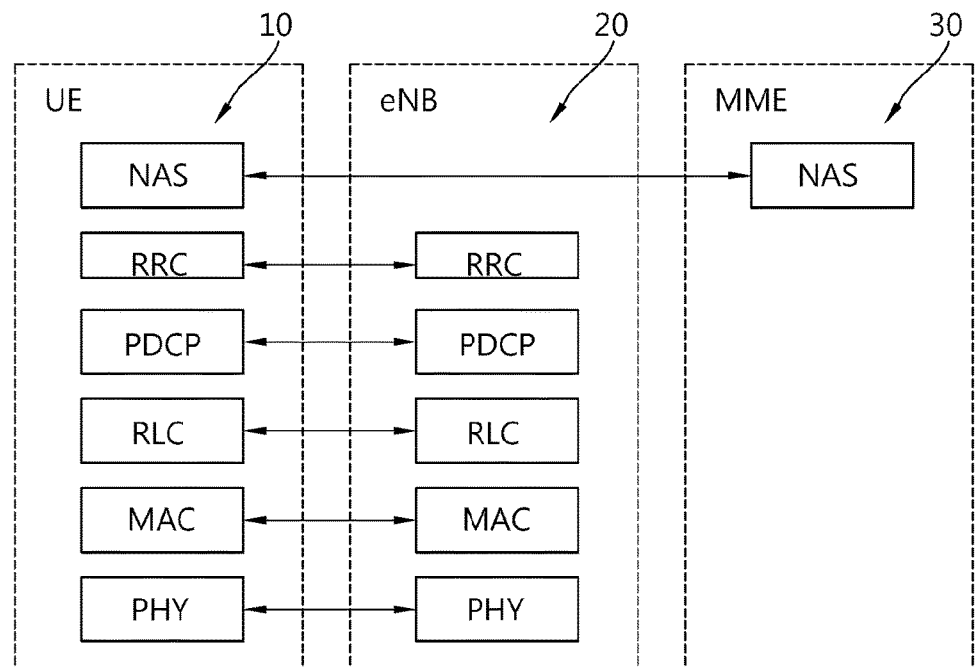
(b)

[Fig. 4]
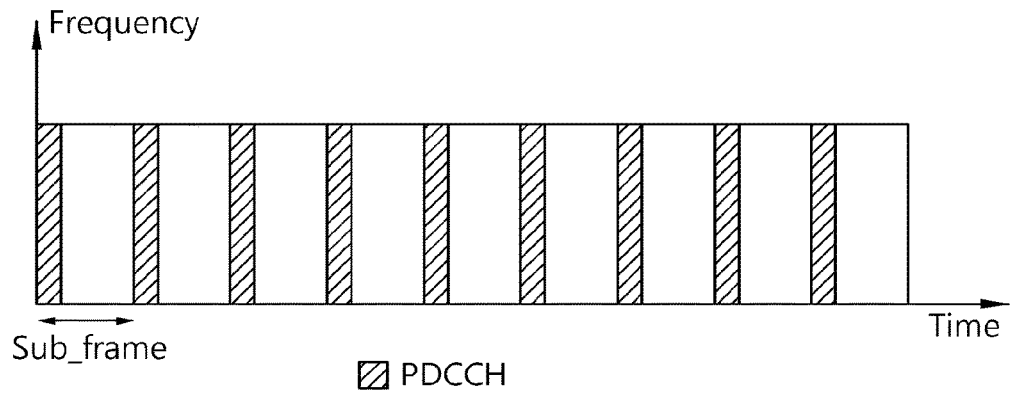
[Fig. 5]
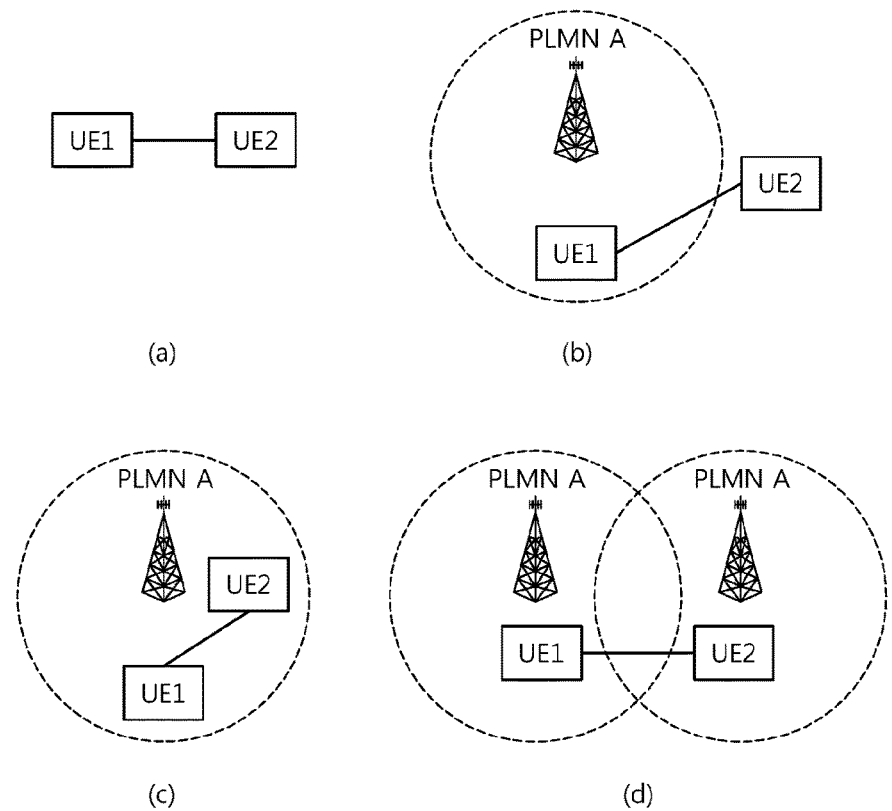

[Fig. 6]
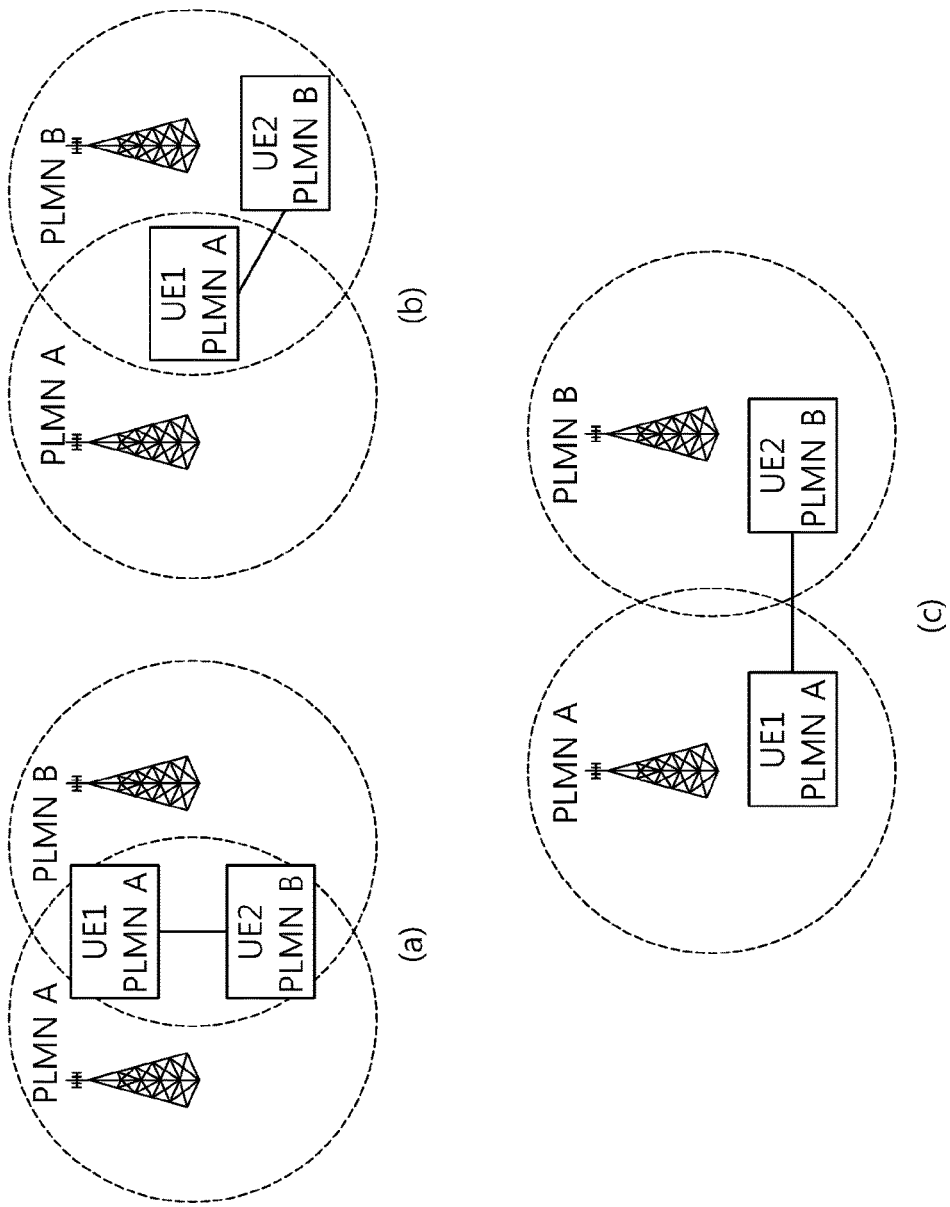

[Fig. 7]
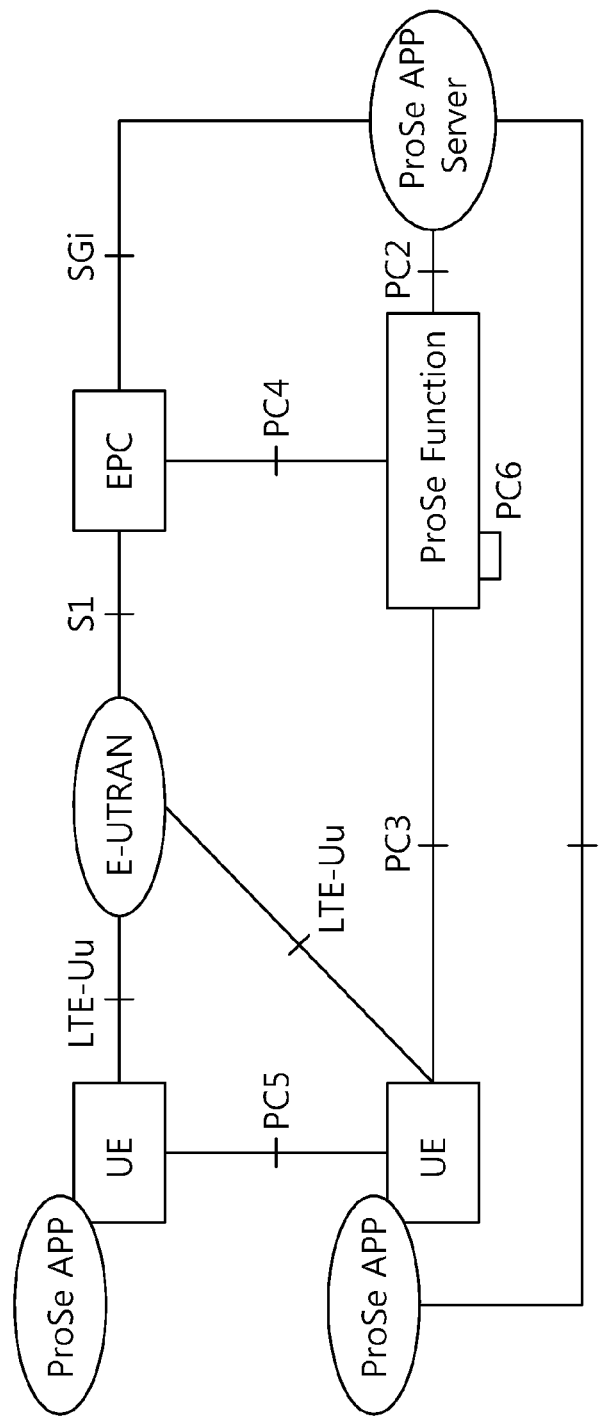

[Fig. 8]
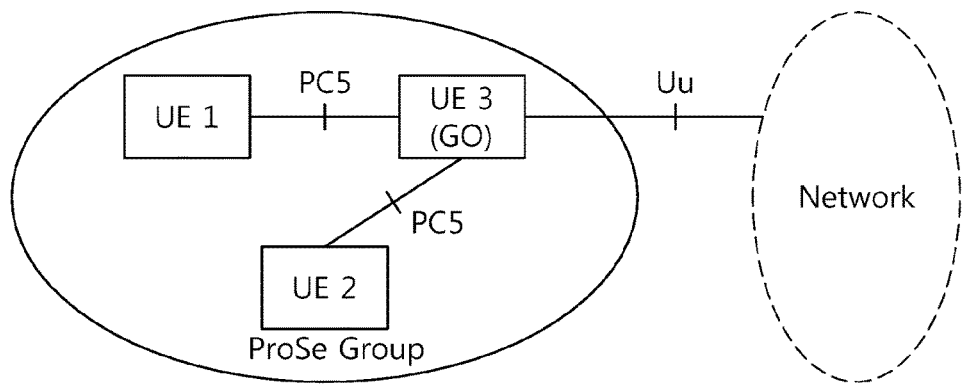
[Fig. 9]
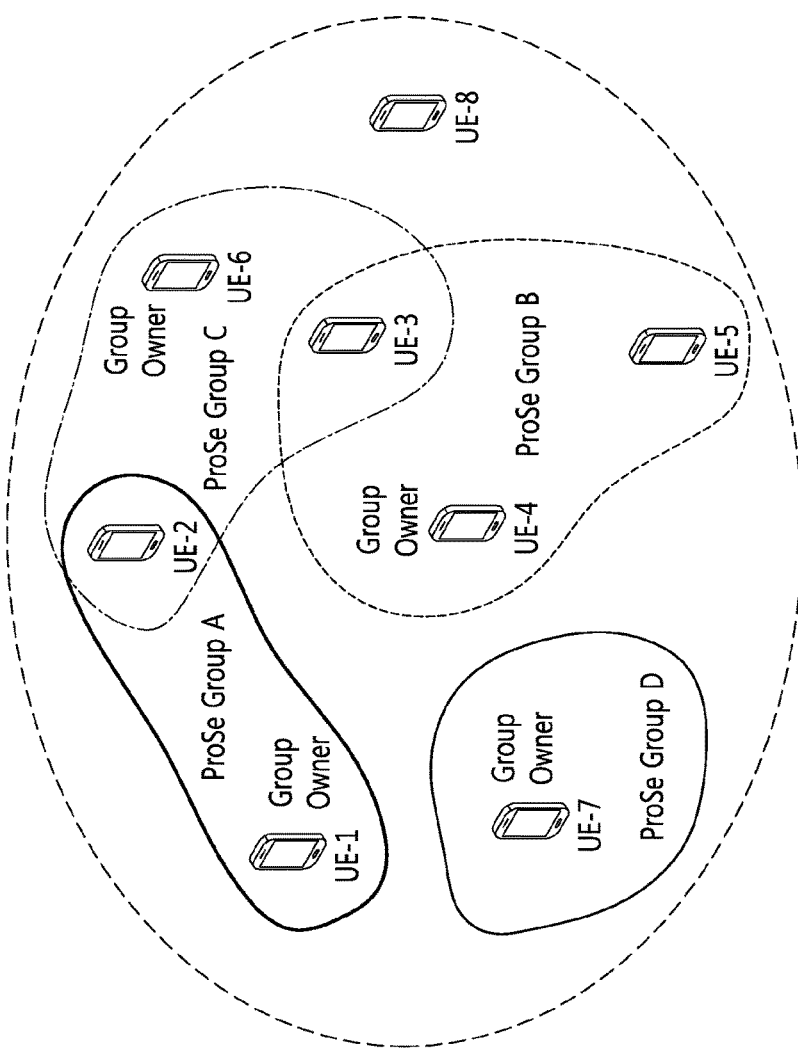

[Fig. 10]
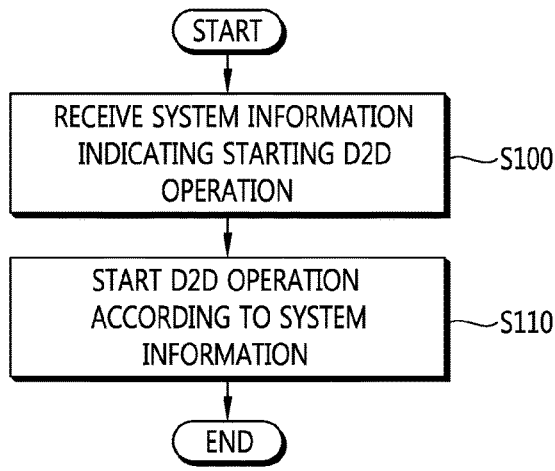
[Fig. 11]
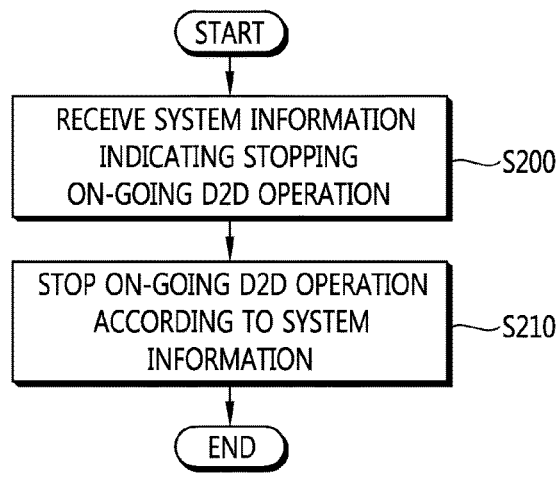
[Fig. 12]
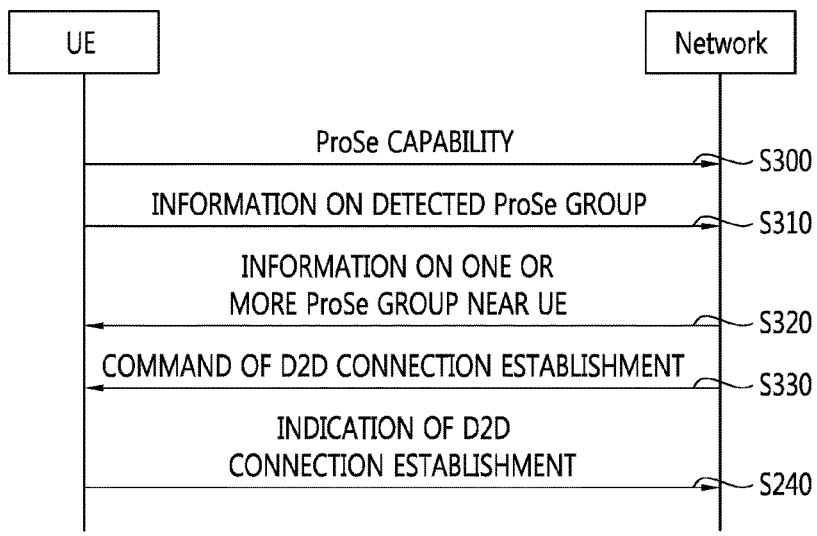

[Fig. 13]
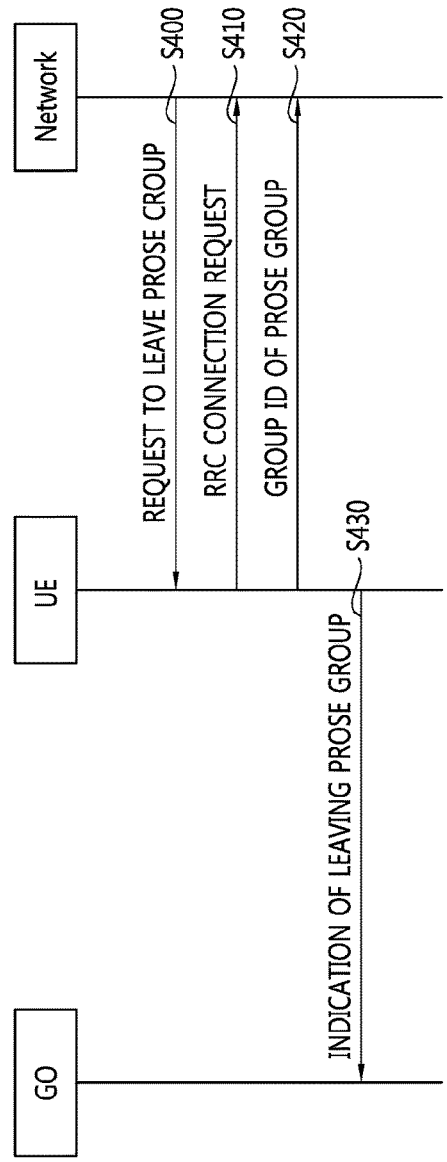
[Fig. 14]
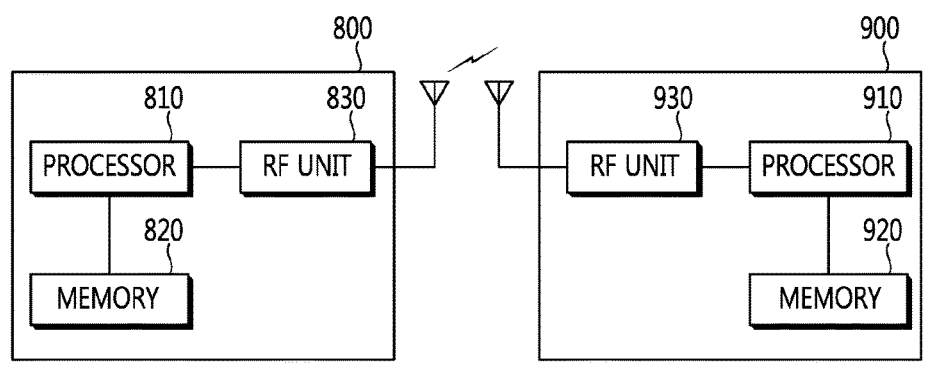

METHOD AND APPARATUS FOR STARTING OR STOPPING DEVICE-TO-DEVICE OPERATION IN WIRELESS COMMUNICATION SYSTEM

CROSS REFERENCE TO RELATED APPLICATIONS

This application is the National Phase of PCT International Application No. PCT/KR2014/007185, filed on Aug. 4, 2014, which claims priority under 35 U.S.C. 119(e) to U.S. Provisional Application No. 61/862,074, filed on Aug. 4, 2013, all of which are hereby expressly incorporated by reference into the present application.

TECHNICAL FIELD

The present invention relates to wireless communications, and more specifically, to a method and apparatus for starting or stopping a device-to-device (D2D) operation in a wireless communication system.

BACKGROUND ART

Universal mobile telecommunications system (UMTS) is a $3^{rd}$ generation (3G) asynchronous mobile communication system operating in wideband code division multiple access (WCDMA) based on European systems, global system for mobile communications (GSM) and general packet radio services (GPRS). A long-term evolution (LTE) of UMTS is under discussion by the $3^{rd}$ generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Recently, there has been a surge of interest in supporting direct device-to-device (D2D) communication. This new interest is motivated by several factors, including the popularity of proximity-based services, driven largely by social networking applications, and the crushing data demands on cellular spectrum, much of which is localized traffic, and the under-utilization of uplink frequency bands. 3GPP is targeting the availability of D2D communication in LTE rel-12 to enable LTE become a competitive broadband communication technology for public safety networks, used by first responders. Due to the legacy issues and budget constraints, current public safety networks are still mainly based on obsolete 2G technologies while commercial networks are rapidly migrating to LTE. This evolution gap and the desire for enhanced services have led to global attempts to upgrade existing public safety networks. Compared to commercial networks, public safety networks have much more stringent service requirements (e.g., reliability and security) and also require direct communication, especially when cellular coverage fails or is not available. This essential direct mode feature is currently missing in LTE.

From a technical perspective, exploiting the nature proximity of communicating devices may provide multiple performance benefits. First, D2D user equipments (UEs) may enjoy high data rate and low end-to-end delay due to the short-range direct communication. Second, it is more resource-efficient for proximate UEs to communicate directly with each other, versus routing through an evolved NodeB (eNB) and possibly the core network. In particular, compared to normal downlink/uplink cellular communication, direct communication saves energy and improves radio resource utilization. Third, switching from an infrastructure path to a direct path offloads cellular traffic, alleviating congestion, and thus benefitting other non-D2D UEs as well. Other benefits may be envisioned such as range extension via UE-to-UE relaying.

From an economic perspective, LTE D2D should create new business opportunities, though its commercial applications are not the focus in LTE rel-12. For example, many social networking applications rely on the ability to discover users that are in proximity, but the device discovery processes typically work in a non-autonomous manner. Users first register their location information in a central server once launching the application. The central server then distributes the registered location information to other users using the application. It would be appealing to the service providers if device discovery can work autonomously without manual location registration. Other examples include e-commerce, whereby private information need only be shared locally between two parties, and large file transfers, e.g., just-taken video clips shared amongst other nearby friends.

Thus far, use cases of 3GPP proximity services (ProSe) and corresponding architecture enhancements have been specified and studied. However, when the UE starts or stops a D2D operation is not clearly defined. Accordingly, a method for starting or stopping a D2D operation is required.

SUMMARY OF INVENTION

Technical Problem

The present invention provides a method and apparatus for starting or stopping a device-to-device (D2D) operation in a wireless communication system. The present invention provides a method for starting or stopping a D2D operation based on system information.

Solution to Problem

In an aspect, a method for starting, by a user equipment (UE) supporting proximity services (ProSe), a device-to-device (D2D) operation in a wireless communication system is provided. The method includes receiving system information which indicates starting a D2D operation from a network, and starting the D2D operation according to the system information.

In another aspect, a method for stopping, by a user equipment (UE) supporting proximity services (ProSe), a device-to-device (D2D) operation in a wireless communication system is provided. The method includes receiving system information which indicates stopping a D2D operation from a network, and stopping the D2D operation according to the system information.

Advantageous Effects of Invention

A D2D operation can be started or stopped effectively based on system information.

BRIEF DESCRIPTION OF DRAWINGS

FIG. 1 shows LTE system architecture.

FIG. 2 shows a block diagram of architecture of a typical E-UTRAN and a typical EPC.

FIG. 3 shows a block diagram of a user plane protocol stack and a control plane protocol stack of an LTE system.

FIG. 4 shows an example of a physical channel structure.

FIG. 5 and FIG. 6 show ProSe direct communication scenarios without a relay.

FIG. 7 shows reference architecture for ProSe.

FIG. 8 shows architecture for ProSe communications in group owner mode.

FIG. 9 shows ProSe-enabled UEs arranged in ProSe groups.

FIG. 10 shows an example of a method for starting a D2D operation according to an embodiment of the present invention.

FIG. 11 shows an example of a method for stopping a D2D operation according to an embodiment of the present invention.

FIG. 12 shows an example of a method for relocating a UE from a network to a ProSe Group according to an embodiment of the present invention.

FIG. 13 shows an example of a method for relocating a UE from a ProSe group to a network according to an embodiment of the present invention.

FIG. 14 is a block diagram showing wireless communication system to implement an embodiment of the present invention.

MODE FOR THE INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3$^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink LTE-advanced (LTE-A) is an evolution of the LTE.

For clarity, the following description will focus on LTE-A. However, technical features of the present invention are not limited thereto.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The SGW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

FIG. 3 shows a block diagram of a user plane protocol stack and a control plane protocol stack of an LTE system. FIG. 3-(*a*) shows a block diagram of a user plane protocol stack of an LTE system, and FIG. 3-(*b*) shows a block diagram of a control plane protocol stack of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

FIG. 4 shows an example of a physical channel structure. A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from a higher layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

Referring to FIG. 3-(a), the RLC and MAC layers (terminated in the eNB on the network side) may perform functions such as scheduling, automatic repeat request (ARQ), and hybrid automatic repeat request (HARQ). The PDCP layer (terminated in the eNB on the network side) may perform the user plane functions such as header compression, integrity protection, and ciphering.

Referring to FIG. 3-(b), the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

It is known that different cause values may be mapped o the signature sequence used to transmit messages between a UE and eNB and that either channel quality indicator (CQI) or path loss and cause or message size are candidates for inclusion in the initial preamble.

When a UE wishes to access the network and determines a message to be transmitted, the message may be linked to a purpose and a cause value may be determined. The size of the ideal message may be also be determined by identifying all optional information and different alternative sizes, such as by removing optional information, or an alternative scheduling request message may be used.

The UE acquires necessary information for the transmission of the preamble, UL interference, pilot transmit power and required signal-to-noise ratio (SNR) for the preamble detection at the receiver or combinations thereof. This information must allow the calculation of the initial transmit power of the preamble. It is beneficial to transmit the UL message in the vicinity of the preamble from a frequency point of view in order to ensure that the same channel is used for the transmission of the message.

The UE should take into account the UL interference and the UL path loss in order to ensure that the network receives the preamble with a minimum SNR. The UL interference can be determined only in the eNB, and therefore, must be broadcast by the eNB and received by the UE prior to the transmission of the preamble. The UL path loss can be considered to be similar to the DL path loss and can be estimated by the UE from the received RX signal strength when the transmit power of some pilot sequence of the cell is known to the UE.

The required UL SNR for the detection of the preamble would typically depend on the eNB configuration, such as a number of Rx antennas and receiver performance. There may be advantages to transmit the rather static transmit power of the pilot and the necessary UL SNR separately from the varying UL interference and possibly the power offset required between the preamble and the message.

The initial transmission power of the preamble can be roughly calculated according to the following formula:

Transmit power=TransmitPilot−RxPilot+ULInterference+Offset+SNRRequired

Therefore, any combination of SNRRequired, ULInterference, TransmitPilot and Offset can be broadcast. In principle, only one value must be broadcast. This is essentially in current UMTS systems, although the UL interference in 3GPP LTE will mainly be neighboring cell interference that is probably more constant than in UMTS system.

The UE determines the initial UL transit power for the transmission of the preamble as explained above. The receiver in the eNB is able to estimate the absolute received power as well as the relative received power compared to the interference in the cell. The eNB will consider a preamble detected if the received signal power compared to the interference is above an eNB known threshold.

The UE performs power ramping in order to ensure that a UE can be detected even if the initially estimated transmission power of the preamble is not adequate. Another preamble will most likely be transmitted if no ACK or NACK is received by the UE before the next random access attempt. The transmit power of the preamble can be increased, and/or the preamble can be transmitted on a different UL frequency in order to increase the probability of detection. Therefore, the actual transmit power of the preamble that will be detected does not necessarily correspond to the initial transmit power of the preamble as initially calculated by the UE.

The UE must determine the possible UL transport format. The transport format, which may include MCS and a number of resource blocks that should be used by the UE, depends mainly on two parameters, specifically the SNR at the eNB and the required size of the message to be transmitted.

In practice, a maximum UE message size, or payload, and a required minimum SNR correspond to each transport format. In UMTS, the UE determines before the transmission of the preamble whether a transport format can be chosen for the transmission according to the estimated initial preamble transmit power, the required offset between preamble and the transport block, the maximum allowed or available UE transmit power, a fixed offset and additional margin. The preamble in UMTS need not contain any information regarding the transport format selected by the EU since the network does not need to reserve time and frequency resources and, therefore, the transport format is indicated together with the transmitted message.

The eNB must be aware of the size of the message that the UE intends to transmit and the SNR achievable by the UE in order to select the correct transport format upon reception of the preamble and then reserve the necessary time and frequency resources. Therefore, the eNB cannot estimate the SNR achievable by the EU according to the received preamble because the UE transmit power compared to the maximum allowed or possible UE transmit power is not known to the eNB, given that the UE will most likely consider the measured path loss in the DL or some equivalent measure for the determination of the initial preamble transmission power.

The eNB could calculate a difference between the path loss estimated in the DL compared and the path loss of the UL. However, this calculation is not possible if power ramping is used and the UE transmit power for the preamble does not correspond to the initially calculated UE transmit power. Furthermore, the precision of the actual UE transmit power and the transmit power at which the UE is intended to transmit is very low. Therefore, it has been proposed to code the path loss or CQI estimation of the downlink and the message size or the cause value in the UL in the signature.

Proximity Services (ProSe) are described. It may be refer to 3GPP TR 23.703 V0.4.1 (2013-06). The ProSe may be a concept including a device-to-device (D2D) communication. Hereinafter, the ProSe may be used by being mixed with a device-to-device (D2D).

ProSe direct communication means a communication between two or more UEs in proximity that are ProSe-enabled, by means of user plane transmission using E-UTRA technology via a path not traversing any network node. ProSe-enabled UE means a UE that supports ProSe requirements and associated procedures. Unless explicitly stated otherwise, a ProSe-enabled UE refers both to a non-public safety UE and a public safety UE. ProSe-enabled public safety UE means a ProSe-enabled UE that also supports ProSe procedures and capabilities specific to public safety. ProSe-enabled non-public safety UE means a UE that supports ProSe procedures and but not capabilities specific to public safety. ProSe direct discovery means a procedure employed by a ProSe-enabled UE to discover other ProSe-enabled UEs in its vicinity by using only the capabilities of the two UEs with 3GPP LTE rel-12 E-UTRA technology. EPC-level ProSe discovery means a process by which the EPC determines the proximity of two ProSe-enabled UEs and informs them of their proximity.

When the registered public land mobile network (PLMN), ProSe direct communication path and coverage status (in coverage or out of coverage) are considered, there are a number of different possible scenarios. Different combinations of direct data paths and in-coverage and out-of-coverage may be considered.

FIG. 5 and FIG. 6 show ProSe direct communication scenarios without a relay. FIG. 5-(a) shows a case that UE1 and UE2 are out of coverage. FIG. 5-(b) shows a case that UE1 is in coverage and in PLMN A, and UE2 is out of coverage. FIG. 5-(c) shows a case that UE1 and UE2 are in coverage and in PLMN A, and UE1 and UE2 shares the same PLMN A and the same cell. FIG. 5-(d) shows a case that UE1 and UE2 are in coverage and in the same PLMN A, but UE1 and UE2 are in different cells each other. FIG. 6-(a) shows a case that UE1 and UE2 are in coverage, but UE1 and UE2 are in different PLMNs (i.e., PLMN A/B) and different cells each other. UE1 and UE2 are in both cells' coverage. FIG. 6-(b) shows a case that UE1 and UE2 are in coverage, but UE1 and UE2 are in different PLMNs (i.e., PLMN A/B) and different cells each other. UE1 is in both cells' coverage and UE2 is in serving cell's coverage. FIG. 6-(c) shows a case that UE1 and UE2 are in coverage, but UE1 and UE2 are in different PLMNs (i.e., PLMN A/B) and different cells each other. UE1 and UE2 are in its own serving cell's coverage. In the description above, "in coverage and in PLMN A" means that the UE is camping on the cell of the PLMN A and under the control of the PLMN A.

The ProSe direct communication scenarios described above may not cover all possible ProSe communication scenarios. Additional scenarios could be added. The ProSe direct communication scenarios described above are all applicable in cases of network sharing. It is for further study whether the scenarios described above could be enhanced or additional figures should to be added to further clarify the scenarios in relation to network sharing. It is for further study whether ProSe direct communication scenarios described above should be enhanced or new ProSe communication scenarios should be added for group communication. It is for further study whether ProSe direct communication scenarios described above should be enhanced or new ProSe communication scenarios should be added to cover further roaming cases.

Two different modes for ProSe direct communication one-to-one may be supported.

Network independent direct communication: This mode of operation for ProSe direct communication does not require any network assistance to authorize the connection and communication is performed by using only functionality and information local to the UE. This mode is applicable only to pre-authorized ProSe-enabled public safety UEs, regardless of whether the UEs are served by E-UTRAN or not.

Network authorized direct communication: This mode of operation for ProSe direct communication always requires network assistance and may also be applicable when only one UE is "served by E-UTRAN" for public safety UEs. For non-public safety UEs both UEs must be "served by E-UTRAN".

FIG. 7 shows reference architecture for ProSe. Referring to FIG. 7, the reference architecture for ProSe includes E-UTRAN, EPC, plurality of UEs having ProSe applications, ProSe application server, and ProSe function. The EPC represents the E-UTRAN core network architecture. The EPC may include entities such as MME, S-GW, P-GW, policy and charging rules function (PCRF), home subscriber server (HSS), etc. The ProSe application servers are users of the ProSe capability for building the application functionality. In the public safety cases, they may be specific agencies (PSAP), or in the commercial cases social media. These applications may be defined outside the 3GPP architecture but there may be reference points towards 3GPP entities. The application server can communicate towards an application in the UE. Applications in the UE use the ProSe capability for building the application functionality. Example may be for communication between members of public safety groups or for social media application that requests to find buddies in proximity.

The ProSe Function in the network (as part of EPS) defined by 3GPP has a reference point towards the ProSe application server, towards the EPC and the UE. The functionality may include at least one of followings. But the functionality may not be restricted to the followings.

Interworking via a reference point towards the 3rd party applications

Authorization and configuration of the UE for discovery and direct communication Enable the functionality of the EPC level ProSe discovery ProSe related new subscriber data and handling of data storage, and also handling of ProSe identities Security related functionality Provide control towards the EPC for policy related functionality Provide functionality for charging (via or outside of EPC, e.g., offline charging)

Reference points/interfaces in the reference architecture for ProSe are described.

PC1: It is the reference point between the ProSe application in the UE and in the ProSe application server. It is used to define application level signalling requirements.

PC2: It is the reference point between the ProSe application server and the ProSe function. It is used to define the interaction between ProSe application server and ProSe functionality provided by the 3GPP EPS via ProSe function. One example may be for application data updates for a ProSe database in the ProSe function. Another example may be data for use by ProSe application server in interworking between 3GPP functionality and application data, e.g., name translation.

PC3: It is the reference point between the UE and ProSe function. It is used to define the interaction between UE and ProSe function. An example may be to use for configuration for ProSe discovery and communication.

PC4: It is the reference point between the EPC and ProSe function. It is used to define the interaction between EPC and ProSe function. Possible use cases may be when setting up a one-to-one communication path between UEs or when validating ProSe services (authorization) for session management or mobility management in real time. Depending on the function needed, PC4 may terminate in different EPC entities and may reuse existing interfaces.

PC5: It is the reference point between UE to UE used for control and user plane for discovery and communication, for relay and one-to-one communication (between UEs directly and between UEs over LTE-Uu).

PC6: This reference point may be used for functions such as ProSe discovery between users subscribed to different PLMNs.

SGi: In addition to the relevant functions via SGi, it may be used for application data and application level control information exchange.

Applicability of the above interfaces/reference points may be dependent on solutions developed for ProSe.

For ProSe communication, various solutions have been discussed. One of the solutions for the ProSe communication, ProSe communications in group owner mode has been discussed. The ProSe group owner mode may address "ProSe one-to-many communications", which is one of key issues of ProSe communication. The ProSe one-to-many communications refers to ProSe group communication and ProSe broadcast communication. One-to-many communications may also work without prior discovery. It is designed to work in or out of network coverage. Further, the ProSe group owner mode may be used whenever there is a possibility for stable group ownership, such as the relay use cases (i.e., UE-to-UE relay and UE-to-network relay). In that sense, the ProSe group owner mode may address "relay for public safety ProSe" key issue. Relays are specific to public safety use cases. The relays can be used for both ProSe communication one-to-one and one-to-many. Further, the ProSe group owner mode may also be used for ProSe one-to-one communication, and accordingly, the Prose group owner mode may address "ProSe direct communication one-to-one" key issue.

FIG. 8 shows architecture for ProSe communications in group owner mode. Referring to FIG. 8, architecture for ProSe communications in group owner mode includes a ProSe group, and the ProSe group includes a plurality of UEs, i.e., UE1, UE2, and UE3. UE3 acts as a group owner (GO) of the ProSe group. A reference point PC5 has been enhanced compared with FIG. 7. In FIG. 8, reference point PC5 is the "lower layer" (ProSe) reference point between a UE and a UE acting as a ProSe GO. It provides basic IP connectivity between the two UEs.

Before direct communication can be established between two or multiple ProSe-enabled UEs, these UEs need to become members of the same ProSe Group. Essentially, a ProSe group is a private IP network composed by one or more member UEs that can securely communicate with any IP-based application. Each ProSe group is characterised by a locally unique identity. The procedure with which a new ProSe group is created is called group formation procedure.

One of the UEs in a ProSe group plays the role of the GO (UE3 in FIG. 8), i.e., implements special functionality that facilitates the group formation and operation. The GO is similar to a wireless access router. That is, it announces the group (e.g., by broadcasting a certain group identity) and admits or rejects new UEs that request to become group members. It also authenticates new group members and provides them with IP configuration data. The GO creates the group identity with a pseudo-random fashion so that the group identity can be assumed locally unique, i.e., unique across all other groups that operate in the same area. The GO is within the transmission range of all ProSe group members, however, the ordinary (non-GO) ProSe group members need not be within transmission range of each other.

There is a clear ProSe group formation procedure whereby individual members join the ProSe group by performing mutual authentication with the GO, or each ProSe group member is assigned an IP address/prefix by the GO, or the ProSe group members form a distinct IP subnet.

All traffic exchanged within the ProSe group is forwarded via the GO. The GO behaves also as a communication bridge, i.e., it receives all transmissions from the group members and (if necessary) forwards the transmissions to other group members (e.g., based on the L2 or L3 destination address). Multicast traffic (i.e., traffic destined to some or all ProSe group members) sent by an ordinary ProSe group member is delivered in unicast mode to the GO, which subsequently distributes it to all ProSe group members. The distribution from the GO can be in either unicast or multicast mode (e.g., depending on the number of ProSe group members). The GO may be in position to perform a centralised radio resource control from the GO. The GO may be able to provide some QoS support.

Strong security may be the salient feature of the architecture for ProSe communications in group owner. The GO may be in position to authenticate each UE individually and generate security material during the group formation procedure.

ProSe one-to-many communications in group owner mode are IP-based. IP packets are encapsulated within layer-2 frames. As a minimum, the layer-2 frame header consists of the following fields.

Destination Layer-2 ID: this identifier can take the form of either an individual (unicast) or a group (multicast) identifier. Multicast identifiers are used when the data distribution from the GO to the group members is in multicast mode.

Source Layer-2 ID: this identifier is always set to the individual (unicast) identifier of the sender's device.

UEs engaging in joining the same ProSe group learn their respective Layer-2 IDs during the group formation procedure. Multicast Layer-2 IDs (used only when the GO relies on multicast distribution to other ProSe group members) are assigned using application-layer signaling.

A ProSe group can be formed either autonomously by one or more UEs without any network involvement or with network assistance. The autonomous ProSe group formation procedure is particularly useful in scenarios where a ProSe group needs to be formed outside the network coverage, e.g., to enable direct communication between public safety UEs that need to handle an emergency situation in an isolated area or where network coverage is not available.

FIG. 9 shows ProSe-enabled UEs arranged in ProSe groups. Referring to FIG. 9, there are four ProSe groups. ProSe group A includes UE1 and UE2, and UE1 act as a GO in the ProSe group A. ProSe group B includes UE3, UE4, and UE5, and UE4 act as a GO in the ProSe group B. ProSe group C includes UE2, UE3, and UE6, and UE6 act as a GO in the ProSe group C. ProSe group D includes only UE7, which acts as a GO in the ProSe group D.

An autonomous ProSe group may be created with one of the following ways:

A ProSe-enabled UE may create a ProSe group by autonomously becoming a GO (refer ProSe group D in FIG. 9). This UE creates a new group identity and advertises the existence of the ProSe group (e.g., by broadcasting the group identity on designated radio channel(s)) and serves requests from other ProSe-enabled UEs that want to become group members. In this case, the ProSe group starts as a single-member group (the GO is the only initial member).

A ProSe-enabled UE may start a ProSe group after it discovers (e.g., by using ProSe direct discovery) another ProSe-enabled UE in close proximity. These two UEs negotiate the GO role, i.e., one of them is elected to function as GO. In this case, the ProSe group starts as a two-member group.

An autonomous ProSe group can be expanded when other UEs request to join the group or when other UEs are invited to join the group. The invitation to the group is useful when two UEs need to directly communicate, but they are not members of a common ProSe group. Referring to FIG. 9, for example, if UE5 in the ProSe group B wants to establish direct communication with UE8, which is not a member of ProSe group B, UE5 may send an invitation request message to UE8 and trigger it to join ProSe group B.

Only the GO can accept new members to the group, thus all join requests need to be sent to the GO. The GO can be discovered by its broadcast transmissions. When the GO accepts a new ProSe-enabled UE to join the group, it provides to this UE the necessary security information (a pre-shared key) for securing all further communications with the GO.

When two ProSe-enabled UEs need to establish direct communication, they need first to create a new ProSe group. One of these UEs will be assigned the role of GO and, subsequent to mutual authentication, will provide IP configuration information to the other UE. If necessary, the group may be kept closed by rejecting other UEs to join this group.

An autonomous ProSe group can be created by using E-UTRA Rel-12 radio technology.

The ProSe group may be also considered as a cluster. The GO of the ProSe group may be also considered as a cluster head (CH). Further, ProSe-enabled UEs may be called just UEs in the description below.

A ProSe group may be initially created according to the following procedure.

1. UE1 broadcasts a group invitation with reference signals. The group invitation may include a group ID and UE ID of the UE1. The group identity may be assigned to the UE1, UE2 and other UEs by the network, while UEs are in network coverage.

2. The UE2 and other UEs listen to the group invitation and then determine D2D timing based on the reference signals broadcast by the UE1, if they have the same group ID as the group ID included in the group invitation.

3. The UE2 and other UEs transmit a joining request to the UE1, if they have the same group ID as the group ID included in the group invitation. The joining request may include the group ID and UE ID of each UE.

4. The UE1 transmits a joining response to the UE2 and other UEs. Finally, the UE1 is considered as a temporary ProSe GO, and other UEs are considered as ProSe group members. The ProSe group members may determine D2D timing based on reference signal transmitted by the GO. The GO also relays D2D traffic between a group member and the E-UTRAN serving the GO.

When the UE starts or stops a D2D operation is not clearly defined. Hereinafter, a method for starting or stopping a D2D operation based on system information according to an embodiment of the present invention is described.

FIG. 10 shows an example of a method for starting a D2D operation according to an embodiment of the present invention. It is assumed that the UE supports ProSe, and the UE is configured for one or more ProSe group by the network or the server.

Referring to FIG. 10, in step S100, the UE receives system information which indicates starting a D2D operation from a network. In step S110, the UE starts the D2D operation according to the system information.

The system information may be received from a serving cell or a camped cell. The UE may start the D2D operation immediately upon receiving the system information. Alternatively, the system information may include a D2D start time which indicates when the D2D operation is started. The D2D operation may be started at the D2D start time. The D2D start time may be a periodic D2D start time.

The D2D operation may contain one or more of followings.
  Monitoring D2D discovery message
  Transmitting D2D discovery message
  Monitoring D2D communication message
  Transmitting D2D communication message
  Monitoring D2D reference signal or D2D-related message/data from other UE
  Transmitting D2D reference signal or D2D-related message/data to other UE
  Requesting initiation of D2D discovery or D2D communication to E-UTRAN or other UE.

FIG. 11 shows an example of a method for stopping a D2D operation according to an embodiment of the present invention. It is assumed that the UE supports ProSe, and the UE is configured for one or more ProSe group by the network or the server.

Referring to FIG. 11, in step S200, the UE receives system information which indicates stopping an on-going D2D operation from a network. In step S210, the UE stops the on-going D2D operation according to the system information.

The system information may be received from a serving cell or a camped cell. The UE may stop the D2D operation immediately upon receiving the system information. Alternatively, the system information may include a D2D end time which indicates when the on-going D2D operation is stopped. The on-going D2D operation may be stopped at the D2D end time. The D2D end time may be a periodic D2D end time.

The on-going D2D operation may contain one or more of followings.
  Monitoring D2D discovery message
  Transmitting D2D discovery message
  Monitoring D2D communication message
  Transmitting D2D communication message
  Monitoring D2D reference signal or D2D-related message/data from other UE
  Transmitting D2D reference signal or D2D-related message/data to other UE
  Requesting initiation of D2D discovery or D2D communication to E-UTRAN or other UE.

FIG. 12 shows an example of a method for relocating a UE from a network to a ProSe Group according to an embodiment of the present invention. By starting the D2D operation, the UE may be relocated from the network to the ProSe group. That is, the UE inside network coverage may move from the network to the ProSe group under network control.

Referring to FIG. 12, in step S300, the ProSe-enabled UE provides ProSe capability to a network, i.e., serving cell. The ProSe capability may indicate at least one of whether or not the UE supports ProSe, whether or not the UE supports public safety over D2D communication, or how many D2D connections the UE supports.

In step S310, if the UE detects ProSe group or ProSe-enabled UE nearby, the UE may report the detected ProSe group to the network. The report from the UE may include a ProSe group ID, UE identity of the reporting UE, information on a GO of the detected ProSe group such as UE identity of the GO, information on member UEs for the detected ProSe group, and information on the ProSe-enabled UE such as UE identity. If a ProSe group or a ProSe-enabled UE exists near the UE, or if D2D communication is expected near the UE, the network may configure the UE to detect ProSe group and report the detected group, e.g., by giving the UE information on the ProSe group such as ProSe group ID and radio resource/code/sequence dedicated to the ProSe group. Further, a neighboring cell may inform the serving cell about the ProSe group, ProSe-enabled UE or D2D communication near the UE.

In step S320, the network informs the UE about one or more ProSe group near the UE via a dedicated message on a DCCH or system information on a BCCH, e.g., by receiving reports from one or more UEs. The information provided by the network may include information on the ProSe group such as group ID and radio resource/code/sequence dedicated to the Prose group. The information may also indicate whether or not the ProSe group is only for public safety.

Upon receiving the information on one or more ProSe group near the UE from the network, in step S330, the network commands the UE to establish a D2D connection with either one or more UEs of the ProSe group or another single UE. Upon receiving the command, the UE turns on its D2D radio transceiver, and then tries to detect signal from another UE such as the GO of the ProSe group, based on the information given by the network.

If the UE successfully establishes a D2D connection and joins the ProSe group, In step S340, the UE may transmit an indication of establishment of D2D connection to the network, e.g., up to the MME or the ProSe server. If the UE is in RRC_CONNECTED, the network may release an RRC connection with the UE, upon receiving the indication from the UE.

FIG. 13 shows an example of a method for relocating a UE from a ProSe group to a network according to an embodiment of the present invention. By stopping the D2D operation, the UE may be relocated from the ProSe group to the network. In the embodiment of FIG. 13, it is assumed that the UE belongs to a ProSe group for public safety.

Referring to FIG. 13, in step S400, the network requests the UE to leave the ProSe group. Upon receiving the request from the network, in step S410, the UE transmits an RRC connection request to the network. In step S420, the UE may transmit the group ID of the ProSe group to the network (up to MME or ProSe server) during the connection establishment. The network may establish EPS bearer with the UE for communication with the ProSe Group based on the ProSe group ID afterwards.

In step S430, the UE transmits an indication of leaving the ProSe Group to the GO of the ProSe group. The UE may receive a confirmation of leaving the ProSe group from the GO, and be considered as a non-member of the ProSe group. The GO of the ProSe group may indicate to the UE that the ProSe group is for public safety. The group ID of the ProSe group may correspond to public safety. Thus, the UE may know public safety purpose by the group ID.

Alternatively, it is assumed that the UE belonging to a ProSe group for non-Public safety (e.g., commercial purpose). The UE may transmit an indication of leaving the ProSe group to the GO of the ProSe group after the UE establishes an RRC connection with the network, only if the network requests leaving the ProSe group to the UE. The network may establish EPS bearer with the UE for communication with the ProSe Group based on the ProSe group ID afterwards. The UE may receive a confirmation of leaving the ProSe group from the GO, and be considered as a non-member of the ProSe group. The GO of the ProSe group may indicate to the UE that the ProSe group is for non-public safety. Thus, the UE may know non-public safety purpose by the group ID.

FIG. 14 is a block diagram showing wireless communication system to implement an embodiment of the present invention.

A network 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for controlling, by a user equipment (UE) supporting proximity services (ProSe), a device-to-device (D2D) operation in a wireless communication system, the method comprising:
receiving first system information which indicates starting the D2D operation, from a serving cell of a network;
starting the D2D operation based on the first system information;
receiving second system information, which indicates stopping an on-going D2D operation, from the serving cell of the network; and
stopping the on-going D2D operation based on the second system information,
wherein the first system information includes a D2D start time which indicates when the D2D operation is to start, and
wherein the UE is configured for one or more ProSe groups by the network or a server.

2. The method of claim 1, wherein the D2D operation is started at the D2D start time.

3. The method of claim 1, wherein the D2D start time is a periodic D2D start time.

4. The method of claim 1, wherein the D2D operation includes at least one of monitoring a D2D discovery message, transmitting a D2D discovery message, monitoring a D2D communication message, transmitting a D2D communication message, monitoring a D2D reference signal or a D2D-related message or data from another UE, transmitting a D2D reference signal or a D2D-related message or data to the another UE, or requesting initiation of D2D discovery or D2D communication to the network or the another UE.

5. The method of claim 1, wherein the second system information includes a D2D end time which indicates when the on-going D2D operation is to stop.

6. The method of claim 5, wherein the on-going D2D operation is stopped at the D2D end time.

7. The method of claim 5, wherein the D2D end time is a periodic D2D end time.

8. A user equipment (UE) for supporting proximity services (ProSe) in a wireless communication system, the UE comprising:
a transceiver that transmits or receives a radio signal; and
a processor, coupled to the transceiver, that:
controls the transceiver to receive first system information, which indicates starting a device-to-device (D2D) operation, from a serving cell of a network,
starts the D2D operation based on the first system information,
controls the transceiver to receive second system information, which indicates stopping an on-going D2D operation, from the serving cell of the network, and
stops the on-going D2D operation based on the second system information,
wherein the first system information includes a D2D start time which indicates when the D2D operation is to start, and
wherein the UE is configured for one or more ProSe groups by the network or a server.

* * * * *